(12) United States Patent
Beck et al.

(10) Patent No.: US 7,275,586 B2
(45) Date of Patent: *Oct. 2, 2007

(54) HEATING OR AIR-CONDITIONING SYSTEM FOR A MOTOR VEHICLE

(75) Inventors: Oliver Beck, Deckenpfronn (DE); Michael Förster, Stuttgart (DE); Christian Grömmer, Stetten (DE); Norbert Wöcht, Schwabisch Gmund (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/212,682

(22) Filed: Aug. 29, 2005

(65) Prior Publication Data

US 2006/0042780 A1 Mar. 2, 2006

Related U.S. Application Data

(62) Division of application No. 09/121,702, filed on Jul. 24, 1998, now Pat. No. 6,971,440.

(30) Foreign Application Priority Data

Jul. 24, 1997 (DE) ................. 197 31 908

(51) Int. Cl.
*B60H 1/00* (2006.01)
*B60H 3/00* (2006.01)
*F25B 29/00* (2006.01)

(52) U.S. Cl. ............... 165/42; 165/43; 165/203; 165/103; 454/156; 454/160; 454/161; 237/12.3 A; 237/12.3 B; 237/12.3 R; 236/13; 219/202; 219/208

(58) Field of Classification Search .......... 165/42, 165/43, 103, 203; 454/156, 160, 161, 75; 237/12.3 A, 12.3 B, 12.3 R; 236/13; 219/202, 219/208

See application file for complete search history.

(56) References Cited

U.S. PATENT DOCUMENTS 2,884,228 A 4/1959 Jorgensen
3,228,318 A 1/1966 Wheatley (Continued)

FOREIGN PATENT DOCUMENTS

DE 35 14 359 A1 10/1986

(Continued)

OTHER PUBLICATIONS

"Heiz-oder Klimaanlage fur ein Kraftfahrzeug", Behr Gmbh & Co., Jun. 1996.

*Primary Examiner*—John K. Ford
(74) *Attorney, Agent, or Firm*—Foley & Lardner LLP

(57) ABSTRACT

The invention relates to a heating or air-conditioning system for a motor vehicle, by which individual zones of the vehicle interior can be supplied with separately temperature-controlled air. An improved heating or air-conditioning system, which requires just a small amount of installation space, feeds differently temperature-controlled air to a plurality of air-conditioning zones. Despite the small amount of installation space, optimum mixing of cold air and warm air takes place in the heating or air-conditioning system, with the result that the air emerging from air-outlet openings in a respective air-conditioning zone have a constant temperature over the outlet cross section.

16 Claims, 3 Drawing Sheets

U.S. PATENT DOCUMENTS

| | | | |
|---|---|---|---|
| 3,323,584 A | 6/1967 | Serratto | |
| 3,881,546 A | 5/1975 | Otsuka et al. | |
| 3,967,779 A | 7/1976 | Logsdon | |
| 4,263,842 A | 4/1981 | Moore | |
| 4,607,565 A | 8/1986 | Sugawara et al. | |
| 4,724,898 A | 2/1988 | Stolz et al. | |
| 4,759,269 A | 7/1988 | Brown et al. | |
| 4,829,884 A | 5/1989 | Kagohata | |
| 4,852,639 A | 8/1989 | Horiguchi et al. | |
| 4,905,580 A | 3/1990 | Komori et al. | |
| 5,016,704 A | 5/1991 | Ono | |
| 5,505,251 A | 4/1996 | Sarbach | |
| 5,524,938 A * | 6/1996 | Halder | 285/201 |
| 5,775,407 A | 7/1998 | Inoue | |
| 5,878,806 A | 3/1999 | Denk et al. | |
| 6,971,440 B1 * | 12/2005 | Beck et al. | 165/42 |

FOREIGN PATENT DOCUMENTS

| | | |
|---|---|---|
| DE | 35 42 626 C2 | 11/1989 |
| DE | 90 01 590 U1 | 5/1990 |
| DE | 39 40 361 A1 | 6/1991 |
| DE | 39 25 726 C2 | 9/1991 |
| DE | 41 19 474 A1 | 12/1992 |
| DE | 44 22 120 A1 | 1/1996 |
| DE | 295 04 860 U1 | 3/1996 |
| DE | 44 42 000 A1 | 5/1996 |
| DE | 196 46 123 A1 | 5/1998 |
| FR | 2 717 747 B1 | 9/1995 |
| JP | 57-026010 A | 2/1982 |
| JP | 57-178914 A | 11/1982 |
| JP | 57-182514 A | 11/1982 |
| JP | 58-122213 A | 7/1983 |
| JP | 58-136813 | 9/1983 |
| JP | 60-193713 A | 10/1985 |
| JP | 62-064611 A | 3/1987 |
| JP | 62-125911 A | 6/1987 |
| JP | 63-151309 U | 10/1988 |
| JP | 63-305017 A | 12/1988 |
| JP | 03-010922 A | 1/1991 |
| JP | 04-349017 A | 12/1992 |
| JP | 07-276967 A | 10/1995 |

* cited by examiner

HEATING OR AIR-CONDITIONING SYSTEM FOR A MOTOR VEHICLE

The present application is a divisional of U.S. application Ser. No. 09/121,702, filed Jul. 24, 1998, now U.S. Pat. No. 6,971,440, the entire contents of which is incorporated herein by reference.

BACKGROUND OF THE INVENTION

1. Field of the Invention

The invention relates to a heating or air-conditioning system for a motor vehicle, by means of which individual air-conditioning zones of the vehicle interior can be supplied with separately temperature-controlled air.

2. Description of the Related Art

FR 2717747 discloses an air-conditioning installation by means of which the air fed to the various air-conditioning zones, namely the "front right" (passenger seat) and "front left" (driver's seat) zones and the "rear left" and "rear right" zones, can be adjusted separately. For this purpose, the air-conditioning installation has two air-conditioning systems, one supplying the left-hand half of the vehicle and the other supplying the right-hand half of the vehicle. Each of the air-conditioning systems can be used to supply the front region and rear region with differently temperature-controlled air. This air-conditioning installation involves very high outlay since it has two air-conditioning systems, each with a fan, evaporator and heater and corresponding air lines. The system is thus correspondingly cost-intensive and, as a result of the large amount of space that it requires, can only be used in large-capacity vehicles.

DE 39 40 361 discloses an air-conditioning system by means of which four air-conditioning zones can be supplied. In this air-conditioning system, warm air and cold air are produced and fed to each air-conditioning zone via separate ducts. In the region of the air-outlet openings arranged in the respective air-conditioning zone, there is provided for each air-conditioning zone a mixing space, in which warm air and cold air can be mixed immediately before they emerge into the vehicle interior. Although such an air-conditioning system can supply four air-conditioning zones with just one fan, one evaporator and one heater, the air ducts require a considerable amount of installation space since, for the air supply for each air-conditioning zone, it is necessary to provide two air ducts, which each open out into a mixing space. A further disadvantage is that the warm air and cold air are only mixed immediately before they emerge from the air-outlet nozzles, with the result that mixing is often insufficient and hot and cold air masses emerge one beside the other from an air-outlet nozzle.

U.S. Pat. No. 5,016,704 discloses a motor-vehicle air-conditioning system by means of which just two air-conditioning zones, namely the front region and the rear region, can be differently air conditioned. This air-conditioning system is divided in two downstream of the evaporator. In each sub-region, an air flux regulates the quantity of air that is heated by the heater or is routed past the heater. Warm air and cold air can mix downstream of the heater and are fed to the individual outlet nozzles. The disadvantage with this air-conditioning system is that it requires a large amount of installation space and good air mixing is not ensured. Furthermore, it is only possible for two zones to be air conditioned.

DE 44 22 120 discloses an air-conditioning system which has left/right regulation. In order to obtain a compact design, the cold air is routed past the heat exchanger laterally and mixed with the warm air behind the heat exchanger. Despite the already more compact design, the amount of installation space required by this air-conditioning system on account of the warm-air pivot flaps, which are located downstream of the heat exchanger and execute a pivot movement into the mixing space, is relatively large. A further disadvantage is that optimum mixing of cold air and warm air is not ensured since, even in its open state, the warm-air pivot flap separates the cold and warm air masses to a certain extent. Furthermore, this air-conditioning system is not suitable for supplying more than two air-conditioning zones.

SUMMARY OF THE INVENTION

An object of the invention is to provide an improved heating or air-conditioning system which is of straightforward construction, requires just a small amount of installation space, and by means of which differently temperature-controlled air can be fed to a plurality of air-conditioning zones. Despite the small amount of installation space, optimum mixing of cold air and warm air is to take place in the heating or air-conditioning system, with the result that the air emerging from air-outlet openings in a respective air-conditioning zone is not in divided form, i.e., the emerging air has to have a constant temperature over the outlet cross section.

In accordance with this and further objectives, the present invention provides a heating or air-conditioning system for a motor vehicle comprising a heater for producing warm air, at least two cold-air ducts which are routed past the heater laterally, an air-mixing space which adjoins the heater in the direction of air flow and is divided, by at least one partition wall, into individual mixing spaces in which air can be mixed by air-stream control elements to a certain temperature in each case and, from there, can be fed to an associated air-conditioning zone via in each case at least one air duct and via in each case at least one air-outlet nozzle, wherein each mixing space is assigned at least two of the air-stream control elements of which one is provided as a cold-air flap in the cold-air duct and a second is designed as a warm-air control element arranged directly on an outlet side of the heater, the warm-air control element having a plurality of lamellae which are arranged in the manner of a blind and, in their closed position, cover a sub-region of the outlet side of the heater which is assigned to the respective mixing space.

The further objectives, features, and advantages of the invention will become apparent from the detailed description that follows.

BRIEF DESCRIPTION OF THE FIGURES

The invention is explained in detail hereinbelow by way of an exemplary embodiment, with reference to the drawing, in which.

DETAILED DESCRIPTION OF PREFERRED EMBODIMENT

Figure 1:
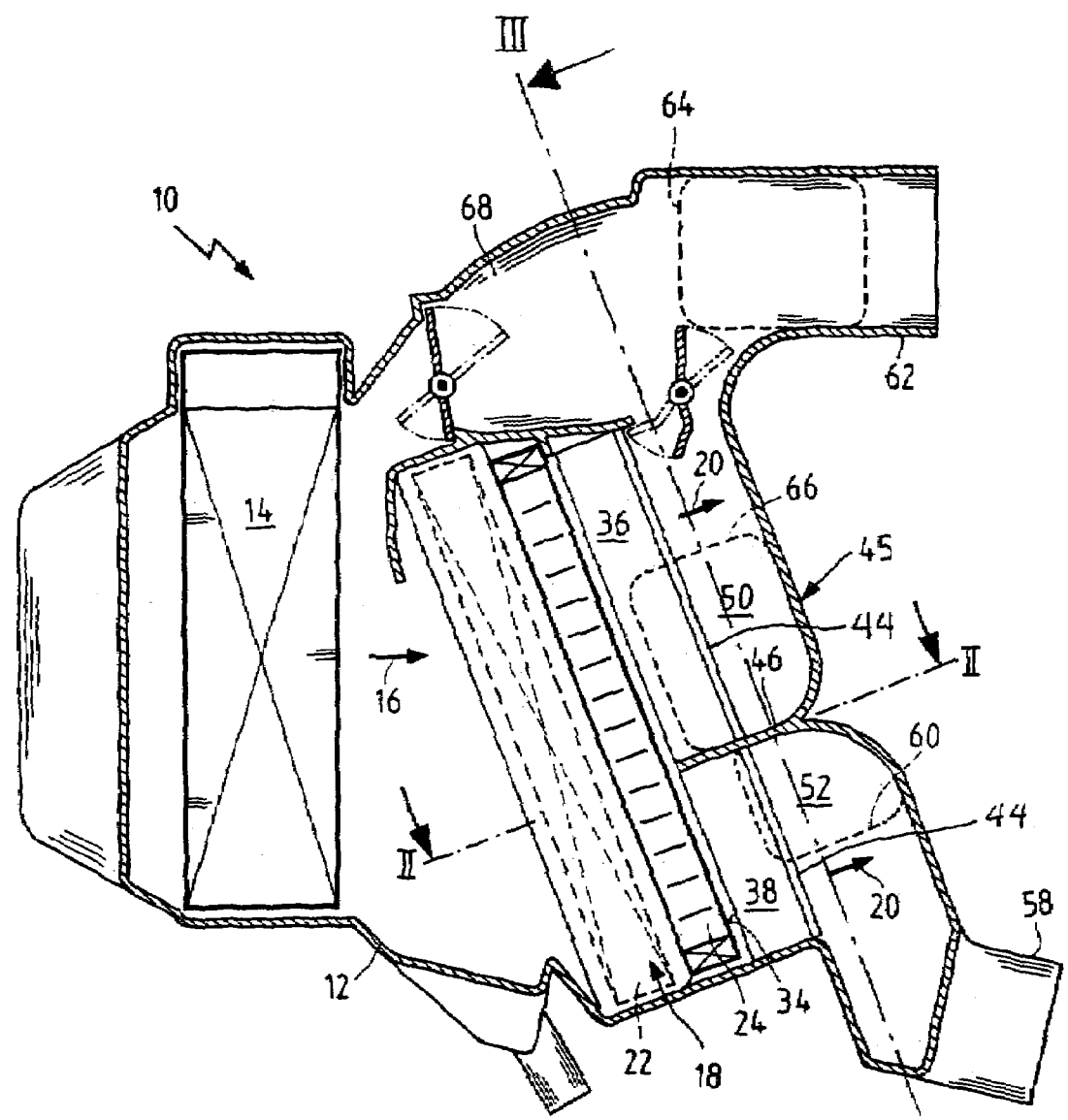
FIG. 1 is a cross-section view showing the left half, taken along line I-I in FIGS. 2 and 3, of a heating and/or air conditioning system according to the present invention.

The present invention relates to heating or air-conditioning system for a motor vehicle, having a heater (18) for producing warm air (20), having at least two cold-air ducts (26 and 28) which are routed past the heater (18) laterally in each case, and having an air-mixing space (45) which adjoins the heater (18) in the direction of flow and is divided, by at least one partition wall (46 and 48), into individual mixing spaces (50 to 56) in which air can be mixed, by air-stream control elements (30, 32 and 36 to 42), to a certain temperature in each case and, from there, can be fed to an associated air-conditioning zone via in each case at least one air duct (58 to 64) feeding in each case at least one air-outlet nozzle (not shown), wherein each mixing space (50 to 56) is assigned at least two of the air-stream control elements (30 and 36; 30 and 38; 32 and 40; or 32 and 42) of which one is provided as a cold-air flap (30 or 32) in that the cold-air duct (26 or 28, respectively) and a second is designed as a warm-air control element (36, 38, 40, 42) arranged directly on an outlet side (34) of the heater (18), each warm-air control element (36, 38, 40, 42) having a plurality of lamellae (44), which are known per se, arranged in the manner of a blind and, in their closed position, cover a sub-region of the outlet side (34) of the heater (18) which is assigned to the respective mixing space (50, 52, 54, 56).

In certain embodiments the air-mixing space (45) is divided into four individual mixing spaces (50 to 56).

In certain embodiments each cold-air duct (26 and 28) is divided in two and each of the four cold-air ducts (26, 26', 28, 28') then obtained opens out in each case into one mixing space (50, 52, 54, 56).

In certain embodiments the cold-air flaps (30, 30', 32, 32') are is arranged in the region of a cold-air-duct outlet (27) and, in its open position, executes an air-directing function and deflects the cold air (16) in the direction of the warm air (20).

In certain embodiments the cold-air flap (30) is of curved form.

In certain embodiments the warm-air control elements (36 to 42) open toward the cold-air duct (26 or 28), and the lamellae (44), in their open position, execute an air-directing function and deflect the warm air (20) to the side, in the direction of the cold air (16).

In certain embodiments the heater (18) has a heat exchanger (22), which can have drive unit coolant of a motor vehicle flowing through it, and an additional heater (24), which is arranged parallel to said heat exchanger and preferably has electric heating elements.

In certain embodiments in each case two adjacent warm-air control elements (36 and 38) and two adjacent cold-air flaps (30 and 30') can be coupled.

If according to the invention, each mixing space is assigned at least two of the air-stream control elements, of which one is provided as a cold-air flap in the cold-air duct and a second is designed as a warm-air control element arranged directly on the outlet side of the heater, it is possible for the cold-air stream and the warm-air stream to be regulated separately from one another, this permitting optimum temperature regulation of the air in the respective mixing space.

According to the invention, the warm-air control element is constructed from a plurality of lamellae which are known per se (for example from DE 41 19 474 hereby incorporated by reference in its entirety), are arranged in a manner of a blind and, in their closed position, cover a sub-region of the outlet side of the heater which is assigned to the respective mixing space. This configuration of the warm-air control elements can cut back on a considerable amount of installation space. Furthermore, these blind-like warm-air control elements do not, as was the case with the known warm-air pivot flaps, project into the mixing space, this ensuring better mixing of the cold air with the warm air emerging from the heater.

Each mixing space is assigned a blind-like warm-air control element of this type, with the result that preferably four individual mixing spaces can be provided in an extremely small amount of installation space. This means that the heating or air-conditioning system according to the invention can supply four air-conditioning zones, for example driver's area, passenger area, and rear left and right areas.

In order that each mixing space can also be fed cold air in a separately adjustable manner, each of the two cold-air ducts is divided in two.

If the cold-air flap is arranged in the region of the cold-air duct outlet, that is to say in the vicinity of the mixing space, and, in its open position, executes an air-directing function, the cold air may advantageously be deflected in the direction of the warm air, this ensuring better mixing. For this purpose, the cold-air flap is preferably of curved form.

In the same way, it is advantageous if the warm-air control elements have their lamellae open toward the cold-air duct, with the result that the lamellae, in their open position, deflect the warm air to the side, in the direction of the cold air.

For motor vehicles with low-consumption internal combustion engines which only produce a small amount of waste heat, it is advantageous if in addition to a heat exchanger, which has engine coolant flowing through it, the heater has an additional heater, which is arranged parallel to said heat exchanger and preferably has electric heating elements, such as positive-temperature-coefficient (PTC) heating elements. This means that, even during the warm-up phase of the engine or in extremely cold weather, sufficient amounts of warm air can always be fed to the vehicle interior.

If in each case two adjacent warm-air control elements can be coupled to one another, and the associated cold-air flaps can be coupled to one another, it is extremely simple for the inventive air-conditioning system for four air-conditioning zones to be made into a heating or air-conditioning system for just two air-conditioning zones. For this purpose, all that is required is for the corresponding warm-air control elements and cold-air flaps to be coupled, and corresponding actuators for the warm-air control elements and cold-air flaps which have been coupled on can be dispensed with. This means that the heating or air-conditioning system according to the invention can be used in very versatile fashion and without any additional costs being incurred, that is to say without any additional design measures or new tools, can be used both in vehicles in which there are just two air-conditioning zones and in vehicles in which there are four air-conditioning zones.

The invention is explained in detail hereinbelow by way of an exemplary embodiment, with reference to the drawing. The Figures are for illustrative purposes only and do not limit the scope of the invention.

An inventive heating or air-conditioning system 10, illustrated in the drawing, has a fan (not illustrated) and an evaporator 14, arranged in a housing 12, for producing cold air 16. Arranged downstream of the evaporator 14 is a heater 18 for producing warm air 20. The heater 18 comprises a heat exchanger 22, which can have drive unit coolant of the motor vehicle flowing through it, and optionally an additional heater 24, which is arranged parallel to said heat exchanger and preferably has electric heating elements, such as PTC heating elements.

Figure 2:
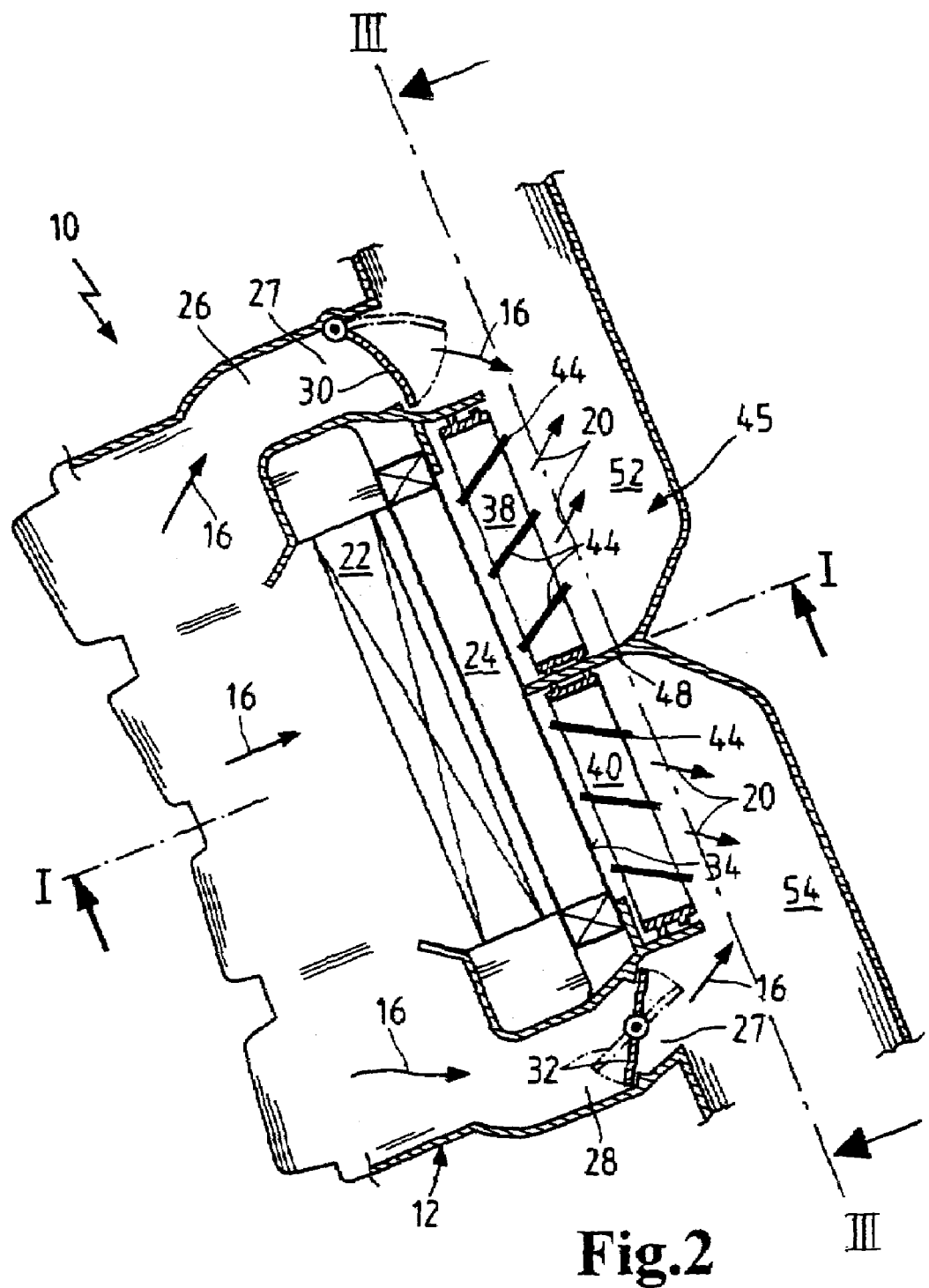
FIG. 2 is a cross-section view showing the lower half, taken along line II-II in FIGS. 1 and 3, of a heating and/or air conditioning system according to the present invention.
Figure 3:
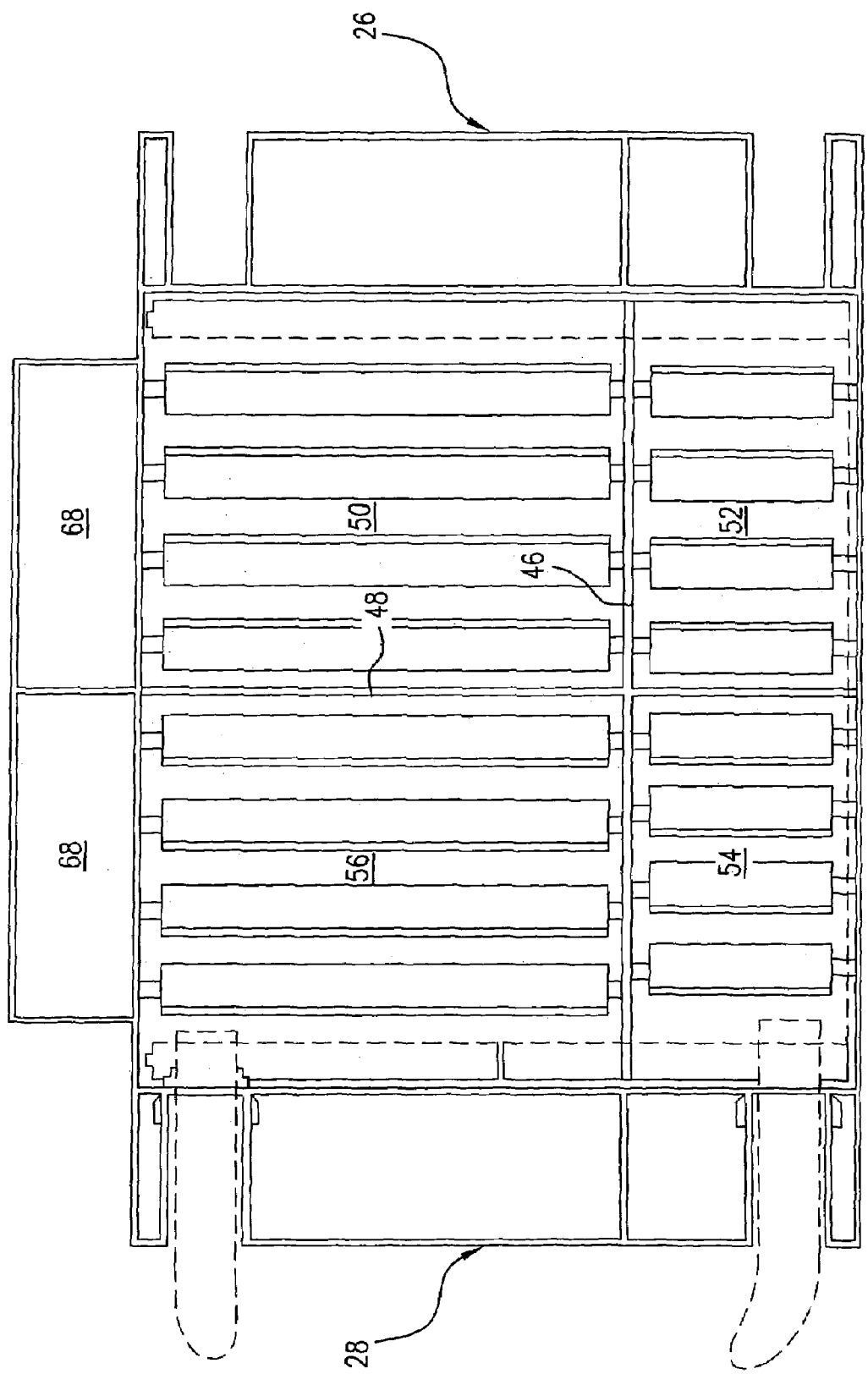
FIG. 3 is a schematic cross-section view, taken along line III-III in FIGS. 1 and 2, of a heating and/or air conditioning system according to the present invention.

As can be seen in FIG. 2, cold-air ducts 26 and 28, which can be closed off via cold-air flaps 30 and 32, are provided to the sides of the heater 18. The cold-air ducts 26 and 28 are preferably each divided in two along a plane.

FIG. 1 illustrates the left half of the housing, illustrating mixing chambers, i.e., spaces, 50 and 52 and warm-air control elements 36 and 38. The right half of the housing, which carries the mixing chambers 56 and 54 and warm-air control elements 42 and 40, is a mirror image of the left half.

Following in the direction of flow, warm-air control elements 36, 38, 40, 42 are provided directly at an outlet side 34 of the heater 18. Each warm-air control element has a plurality of lamellae 44 which are arranged in the manner of a blind and, in order to form one of the warm-air control elements, can be pivoted together in parallel via a coupling (70). In their closed position, the lamellae 44 of a warm-air control element 36, 38, 40, 42 cover an associated sub-region of the outlet side 34 of the heater 18.

An air-mixing space 45 follows the warm-air control elements 36 to 42, as seen in the direction of flow, and the warm air 20 heated in the heater 18 and the cold air 16 routed past the heater 18 in the cold-air duct 26 or 28 enters into said air-mixing space and is mixed therein, for the purpose of obtaining air at a desired temperature.

The air-mixing space 45 is divided by at least one partition wall, preferably a plurality of partition walls 46 and 48, into individual mixing spaces. Four mixing spaces 50, 52, 54 and 56 are envisioned in the exemplary embodiment. Each of the mixing spaces 50 to 56 is assigned one of the warm-air control elements 36 to 42, and one of the four cold-air ducts opens out into each of the mixing spaces 50 to 56. The cold-air ducts 26 and 28 are thus each divided into two cold-air sub-ducts along the section line II-II, it being possible for each of the cold-air sub-ducts to be closed off by one of the cold-air flaps 30 or 32. All the flaps, that is to say the four warm-air control elements and the four cold-air flaps, can be activated separately via a control unit. This means that the air temperature in each mixing space can be adjusted separately, with the result that different temperature-controlled air can be fed to four air-conditioning zones.

The cold-air flaps 30 and 32 are preferably arranged at a cold-air-duct outlet 27. In this case, the cold-air flaps 30 and 32 can execute an air-directing function and can deflect, in the direction of the warm air 20 passing through the warm-air control elements 36 to 42, the cold air 16 entering into the respective mixing space. This effect is enhanced by the cold-air flap preferably being of curved form, as is shown in FIG. 2 for the cold-air flap 30. In the same way, the warm air 20 is deflected in the direction of the incoming cold air 16 by the lamellae 44 of the warm-air control elements 36 to 42 opening to the side, that is to say toward the cold-air duct 26 or 28, and, in their open position, being inclined in the direction of the cold-air duct 26 or 28, as is shown in FIG. 2.

Air-directing ducts 58 to 66 branch off from the mixing spaces 50 to 56 and each route the mixed, temperature-controlled air to outlet nozzles (not illustrated) located in the corresponding air-conditioning zones.

Above the heater 18, via a bypass 68 (FIG. 1), cold air can be fed, via the air ducts 62 and 64, directly to a central nozzle and side nozzle, which are provided in the instrument panel.

In a further exemplary embodiment (which is not illustrated), adjacent warm-air control elements, for example those which control the warm air for the front and rear areas, that is to say the warm-air control elements 36 and 38, can be coupled to one another. At the same time, the adjacent cold-air flaps of the cold-air sub-ducts of the cold-air duct 26 or 28 can be coupled to one another. The coupled warm-air control elements and cold-air flaps then need to be driven by just one actuator in each case. With coupling of this type, the heating or air-conditioning system according to the invention can only be used for left/right regulation.

Although only a few exemplary embodiments of this invention have been described in detail above, those skilled in the art will readily appreciate that many modifications are possible in the exemplary embodiments without materially departing from the teachings and advantages of this invention. Accordingly, all such modifications are intended to be included within the scope of this invention.

What is claimed is:

1. A heating or air-conditioning system for a motor vehicle, comprising:
   a housing;
   a heater that produces warm air situated within the housing, wherein the heater is located centrally within the housing and occupies the entire area within an outer periphery having a first lateral side and a second lateral side opposite to said first lateral side;
   first and second cold-air ducts formed in the housing, the first cold air duct located on said first lateral side and the second cold air duct located on said second side of the heater outer periphery, the cold-air ducts being configured to channel air into separate air streams that are each routed laterally around a different one of said opposed lateral sides of the outer periphery of the heater and each cold-air duct having an associated cold-air flap that controls air flow therethrough; and
   partition walls within the housing, the partition walls forming four independent air-mixing chambers downstream of the heater in a direction of air flow, each individual mixing chamber including a warm-air control element that controls air flow therethrough and an air duct that feeds to an associated heating/air-conditioning zone, wherein the warm-air control element includes a plurality of moveable lamellae movable between an open position and a closed position to block heated air from the heater, one of the partition walls dividing each of the cold air ducts into two separate cold air ducts, to define four independent cold air ducts with each cold air duct communicating with one of the air mixing chambers and having said associated cold air flap therein.

2. A heating or air-conditioning system as claimed in claim 1, wherein the cold-air flap is arranged at a mouth of the respective cold-air duct, and movable between an opened position and a closed position, the cold-air flap deflecting cold air toward warm air exiting the heater into the respective air-mixing chamber in its open position.

3. A heating or air-conditioning system as claimed in claim 2, wherein the cold-air flap is curved.

4. A heating or air-conditioning system as claimed in claim 1, wherein the lamellae of each warm-air control element in their open position deflect warm air laterally toward cold air entering the air-mixing chamber from the respective cold air duct.

5. A heating or air-conditioning system as claimed in claim 1, wherein the four heating/air-conditioning zones comprise a front driver side, a front passenger side, a rear right passenger side and a rear left passenger side of a vehicle.

6. A heating or air-conditioning system as claimed in claim 1, wherein the heater includes at least a heat exchanger adapted to have drive unit coolant of a motor vehicle flowing through it.

7. A heating or air-conditioning system as claimed in claim 6, wherein the heater further includes an additional heater arranged parallel to the heat exchanger.

8. A heating or air-conditioning system as claimed in claim 7, where the additional heater includes at least one electric heating element.

9. A heating or air-conditioning system as claimed in claim 1, wherein each cold-air duct is formed between one of said lateral sides and an interior surface of the housing.

10. A heating or air-conditioning system for a motor vehicle, comprising:
   a housing;
   a heater that produces warm air situated within the housing, wherein the heater is located centrally within the housing and occupies the entire area within an outer periphery having a first lateral side and a second lateral side opposite to said first lateral side;
   first and second cold-air ducts formed in the housing, the first cold air duct located on said first lateral side and the second cold air duct located on said second side of the heater outer periphery, the cold-air ducts being configured to channel air into separate air streams that are each routed laterally around a different one of said opposed lateral sides of the outer periphery of the heater and each cold-air duct having an associated cold-air flap that controls air flow therethrough; and
   partition walls within the housing, the partition walls forming four air-mixing chambers downstream of the heater in a direction of air flow, each individual mixing chamber including a warm-air control element that controls air flow therethrough and an air duct that feeds to an associated heating/air-conditioning zone, wherein the warm-air control element includes a plurality of moveable lamellae movable between an open position and a closed position to block heated air from the heater.

11. A heating or air-conditioning system as claimed in claim 10, wherein one of the partition walls divides each of the cold air ducts into two separate cold air ducts, to define four independent cold air ducts with each cold air duct communicating with one of the air mixing chambers and having said associated cold air flap therein.

12. A heating or air-conditioning system as claimed in claim 11, wherein the cold-air flap is arranged at a mouth of the respective cold-air duct, and movable between an opened position and a closed position, the cold-air flap deflecting cold air toward warm air exiting the heater into the respective air-mixing chamber in its open position.

13. A heating or air-conditioning system as claimed in claim 11, wherein the four heating/air-conditioning zones comprise a front driver side, a front passenger side, a rear right passenger side and a rear left passenger side of a vehicle.

14. A heating or air-conditioning system as claimed in claim 10, wherein each cold-air duct is formed between one of said lateral sides and an interior surface of the housing.

15. A heating or air-conditioning system for a motor vehicle, comprising:
   a housing;
   a heater that produces warm air situated within the housing, wherein the heater is located centrally within the housing and occupies the entire area within an outer periphery having a first lateral side and a second lateral side opposite to said first lateral side;
   first and second cold-air ducts formed in the housing, the first cold air duct located on said first lateral side and the second cold air duct located on said second side of the heater outer periphery, the cold-air ducts being configured to channel air into separate air streams that are each routed laterally around a different one of said opposed lateral sides of the outer periphery of the heater and each cold-air duct having an associated cold-air flap that controls air flow therethrough; and
   at least one partition wall within the housing, the partition walls forming air-mixing chambers downstream of the heater in a direction of air flow, each individual mixing chamber including a warm-air control element that controls air flow therethrough and an air duct that feeds to an associated heating/air-conditioning zone, wherein the warm-air control element includes a plurality of moveable lamellae movable between an open position and a closed position to block heated air from the heater,
   wherein the lamellae of each warm-air control element in their open position are oriented to be partially open so as to deflect warm air laterally toward cold air entering the air-mixing chamber from the respective cold air duct.

16. A heating or air-conditioning system as claimed in claim 15, wherein each cold-air duct is formed between one of said lateral sides and an interior surface of the housing.

* * * * *